United States Patent [19]
Yang

[11] Patent Number: 5,828,136
[45] Date of Patent: Oct. 27, 1998

[54] COMBINED POWER SYSTEM USING A ROTATION SPEED AND TORQUE DETECTOR

[76] Inventor: Tai-Her Yang, No. 32 Lane 29 Taipin St., Si-Hu Town, Dzan-Hwa, Taiwan

[21] Appl. No.: 681,448

[22] Filed: Jul. 23, 1996

[51] Int. Cl.⁶ .............................. F01C 13/00; F01D 15/10
[52] U.S. Cl. .............................. 290/4 A; 290/4 R; 290/6; 318/268; 318/258; 318/341
[58] Field of Search .................................. 290/4 A, 412, 290/6; 318/632, 268, 258, 341; 477/3, 5

[56] References Cited

U.S. PATENT DOCUMENTS

| | | | |
|---|---|---|---|
| 4,114,075 | 9/1978 | Minakuchi | 318/341 |
| 4,258,299 | 3/1981 | Takeda et al. | 318/258 |
| 4,354,144 | 10/1982 | McCarthy | 318/13 |
| 5,072,162 | 12/1991 | Sato et al. | 318/268 |
| 5,263,113 | 11/1993 | Naitoh et al. | 388/815 |
| 5,285,111 | 2/1994 | Sherman | 290/4 |
| 5,415,603 | 5/1995 | Tuzuki et al. | 477/5 |
| 5,465,208 | 11/1995 | Mochizuki et al. | 364/426 |
| 5,625,491 | 4/1997 | Ikawa et al. | 318/632 |

Primary Examiner—Steven L. Stephan
Assistant Examiner—Elvin G. Enao
Attorney, Agent, or Firm—Bacon & Thomas, PLLC

[57] ABSTRACT

A combined power system includes an active power source and an auxiliary power source. The rotation speed signal of the active power source and the rotation torque difference between the active power source and an output shaft of the combined power system is used as a basis for controlling the auxiliary power source to provide proportional auxiliary speed driving, or proportional auxiliary torque driving, or reverse damping from regenerative braking.

20 Claims, 4 Drawing Sheets

Axial coupling ratio between the axially translatable rotor and the static structure due to rotation torque difference.

COMBINED POWER SYSTEM USING A ROTATION SPEED AND TORQUE DETECTOR

SUMMARY OF THE INVENTION

A combined power system includes an active power source and an auxiliary power source. The rotation speed signal of the active power source and the rotation torque difference between the active power source and an output shaft of the combined power system is used as a basis for controlling the auxiliary power source to provide proportional auxiliary speed driving, or proportional auxiliary torque driving, or reverse damping from regenerative braking.

DETAILED DESCRIPTION OF THE INVENTION

Figure 1:
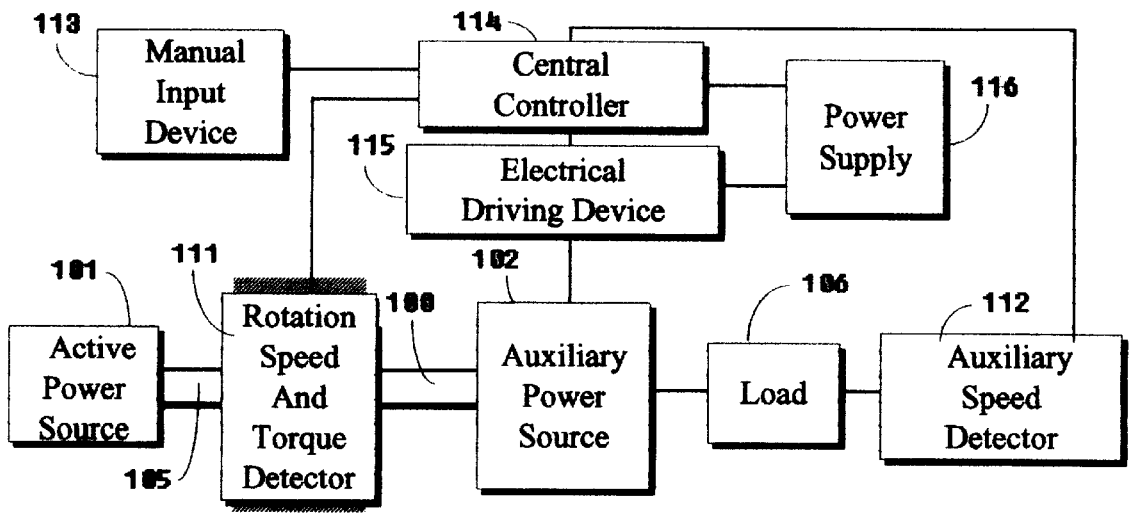
FIG. 1 is functional block diagram of the invention.

The combined power system of the invention uses a co-generative type rotation speed and rotation torque detector device for proportional control of a combined power system having an active power source and an auxiliary power source. The auxiliary power source is controlled by using the rotation speed signal of the active power source and the rotation torque difference between the active power source and an output shaft of the combined power system as the control reference to provide proportional auxiliary speed driving, proportional auxiliary torque driving, or reverse damping from regeneration braking.

More particularly the combined power system of the invention is capable of providing the following functions:

1) By referring to the rotation speed signal of the active power source and the torque difference between the active power source and the output shaft detected by the preferred rotation speed and torque detector device, the auxiliary power source provides proportional auxiliary driving for commonly driving the load together with the active power source.
2) The active power source can also drive the load independently of the auxiliary power source.
3) The auxiliary power source can also drive the load independently of the active power source.
4) By referring to the rotation speed signal of the active power source and the torque difference between the active power source and the output shaft detected by the preferred rotation speed and torque detector device, the auxiliary power source also provides a power regeneration counter driving effect to limit rotation of the output shaft and the load.
5) By referring to the rotation speed signal of the active power source and the torque difference between the active power source and the output shaft detected by the rotation speed and torque detector device, the auxiliary power source also provides a power regeneration counter driving effect to generate reverse damping through the correspondingly reversed kinetic energy.
6) The output shaft may be locked or fixed to independently provide a reverse damping effect.

When the auxiliary power source is controlled to provide additive auxiliary driving in the same direction as the active power source according to a preset corresponding auxiliary driving ratio, the auxiliary driving structure provides the following additional functions: (i) To provide unidirectional or bi-directional auxiliary driving, with the auxiliary driving ration between the active power source and the auxiliary power source being determined by using the rotation speed of the active power source and the torque difference between the active power source and the output shaft, or selected by a manual operating device; (ii) To provide a reverse damping function with the auxiliary power source being controlled by a manual operating device or by the rotation speed of the active power source and the torque difference between the active power source and the output shaft so that the power regeneration effect or counter driving provides a reverse torque to obtain the desired damping, or (iii) To provide load damping of the active power source, with the auxiliary power source being controlled by a manually operated device or being controlled by using the rotation speed of the active power source and the torque difference between the active power source and the load driving auxiliary power source so that the power regeneration effect or counter driving generates the desired load damping.

The above-functions are implemented as follows:

FIG. 1 is a schematic diagram of a combined power system using a rotation speed and rotation torque detector device for proportional control, and which has the following construction:

The active power source 101 includes a power device driven manually or by electric power or other mechanical power and is capable of performing rotational movements. Its power output shaft 105 is directly coupled or power coupled with the auxiliary power source 102 or load 106 through unidirectional devices.

Co-generative rotation speed and rotation torque detector device 111, described in more detail below, is an analog or a digital rotation speed and rotation torque detector device that is used to detect the rotation speed and direction of rotating shaft 105 of the active power source 101 and the torque difference between rotating shaft 105 and output shaft 100. The detecting signal may be generated by electromagnetic, photoelectric, or other physical effects, using a single detection structure or two separate detection structures to produce a signal which combines the rotation speed and the rotation torque difference, or the separated signals from two individual detection structures.

The detection structures may include a mechanical structure which moves in response to the torque difference between active power source output shaft 105 and output shaft 100 while maintaining the transmission status between the shafts using, for example, conventional axial or radial bi-directional translation mechanisms such as bi-directionally actuated screw structures, bi-directional boltless internal or external screw type structures, or bi-directionally actuated axial bevel surfaces or bevel gear coupling mechanisms. The detector converts the bi-directional translation or rotational angular motion of the mechanical structure into an electrical signal using an AC or DC, brushed, brushless, or induction type structure which generates the analog or digital signal in response to the above-mentioned photoelectric, electromagnetic, or other physical effects to obtain a linear or non-linear relative power signal that is positively or inversely proportional to the relative rotational movement, the power signal ratio being changed in response to the relative axial coupling position of shafts 105 and 100.

Auxiliary speed detector device 112 includes an analog or digital rotation speed detector device which is installed to detect the rotation speed of the auxiliary power source of the output shaft, and to input the resulting signal to central controller 114 to provide speed limiting or other output speed control signal feedback. This detector device can be omitted for an open type (no feedback) system.

Output shaft 100 is installed between the output side and the rotation speed and torque detector device 111 for transmitting rotational kinetic energy from the active power source 101.

Manual operating device 113 is an input device that may include electromechanical or solid state electronic components as well as control mechanism interfaces that enable it to be manually operated to produce digital or analog electric power signals or to receive inputs from other electric power signal interfaces for transmission to the central controller 114, and for further controlling the operating power of the auxiliary power source in order to provide proportional auxiliary driving or proportional reverse damping.

Central controller 114 is an analog or digital electric circuit device made up of electromechanical or solid state electronic components, or microprocessors, arranged to receive the output of cognerating type rotation speed and rotation torque detector device 111 driven by the active power source 101, and commands from the manual operating device 113 to control the electrical driving device 115 and further to drive the auxiliary power source 102 in order to carry out selected motor or power regeneration functions or operations, with the relationship between control of the active power source 101, auxiliary power source 102, and the output shaft 100 being either linear or non-linear, utilizing closed, open, or semi-closed loop feedback as required.

Electrical machine driving device 115 also may be either an electromechanical or solid state electronic device, and is operated by central controller 114 or by the manual operating device 113 to control the input/output power and the rotational directions of the auxiliary power source 102.

Auxiliary power source 102 is a rotational electrical machine which has motor functions or has the generator functions, and which may be made up of a double-acting rotational electrical machine 102A or combined stator and rotor electrical machines 102C, 102C or 102D, with the coupling methods for the different examples with the active power source 101 having different operating functions.

Load 106 is a rotational or linear translational mechanism which accepts the rotational power input.

Figure 2:
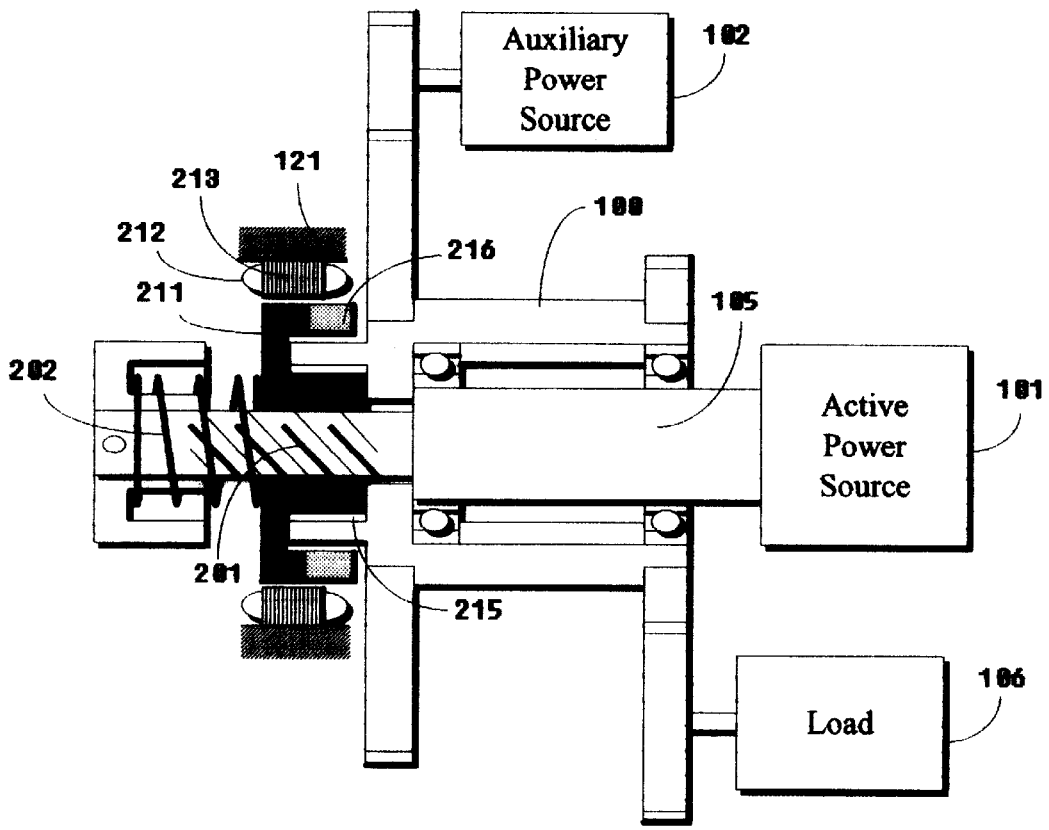
FIG. 2 is a schematic diagram of a rotation speed and rotation torque detector device according to a first preferred embodiment of the invention.

FIG. 2 is a schematic diagram of a first preferred co-generating type rotational speed and rotational torque detector device, which is constructed as follows:

An active power source rotation shaft 105 is driven by the rotational kinetic energy of the active power source 101, and a screw structure 201 is provided between the active power source rotation shaft 105 and the shaft hole of the axially translatable rotor 211. The screw structure 201 is comprised of a threaded or unthreaded roller-type screw arranged to be bi-directionally interactive, i.e. the active power source rotation shaft 105 can be rotated to cause the axially translatable rotor 211 to be translated axially, the axially translatable rotor 211 under pressure can drive the active power source rotation shaft 105 to rotate, or the axially translatable rotor 211 can be rotated by itself. A lock key assembly or other mechanism 215 that permits axial sliding between the rotor 211 and shaft 100 while also enabling rotational transmission is provided between the axially translatable rotor 211 and the output shaft 100 to allow relative axial translation during rotational transmission between shafts 105 and 100 while maintaining the transmission status.

A pre-compressed spring 202 is installed between the active power source rotation shaft 105 and the active power source 101 to pre-compress or bias the axially translatable rotor 211 in order to cause relative axial translation of the rotor according to the direction and intensity of the transmission torque during the rotational power transmission between the active power source rotation shaft 105 and the axially translatable rotor 211, so that the axial translatable rotor 211 is correspondingly coupled with the static structure installed on the casing 121. The detector electric power signal is produced during this rotational interaction, with the intensity of the electric power detecting signal being determined by the relative rotation speed and the axial coupling positions of the axially translatable rotor 211 and the static structure, the rotation speed being determined by the relative rotation speed between the active power source 101 and the casing 121, and the axial relative position being determined by the torque difference between the active power source 101 and the output shaft 100, the axial rotational translation produced by the axially translatable rotor 211 and the pre-compressed spring 202 further changing the axial coupling status between the axially translatable rotor 211 and the static structure.

The static structure relative to which the rotation and position of rotor 211 is measured may include a magnetically conductive iron core 213 and electric power detector winding 212, and the axially translatable rotor 211 can be made up of a structure having a magnetic pole 216 and a shaft hole for receiving the interacting screw, with the interface between the static structure and the axially translatable rotor being constituted by a cylindrical or bevel cone structure.

Regardless of the relative position of the axially translatable rotor in the detection device of FIG. 2, when the rotation torque or rotation speed is zero, the output signal of the detector can be either zero, or can be set to be larger than or smaller than zero;

The signal detected by the rotation speed and rotation torque detector device 111 of FIG. 2 can be an analog or a digital signal. If the signal is an analog signal, an analog operational amplifier circuit can be used for signal comparison or signal synthesis, the resulting signal being processed by the central controller 114 to further control the electrical machine driving device 115 in order to provide relative power driving for the auxiliary power source 102 and to provide an upper limit for its power output. In the case of a digital signal, the signal is processed by the central controller 114 to further control the electrical machine driving device 115 to provide relative power driving for the auxiliary power source 102 and to provide an upper limit for its power output.

The mechanical structure which translates due to the torque difference between the rotating shaft 105 and the output shaft 100 while maintaining the transmission status between them includes a detector structure which can convert the bi-directional translation of the rotor 211 or rotation of screw 201 into electric power. The detector structure described above is an induction type structure which generates a relative power signal that may be positively or inversely proportional to the relative rotational movement, the power signal ratio being changed due to the axially relative coupling position.

Output shaft 100 is driven by the rotational kinetic energy of the active power source 101 through the axially translatable rotor 211, and by the rotational kinetic energy of the auxiliary power source via an indirect driving mechanism through transmission components or via a direct coupling between the output shaft 100 and the rotor of the auxiliary power source 102. Methods of coupling with the load include direct coupling with the load, or through transmission devices such as a gear, chain wheel and linkages.

Figure 3:
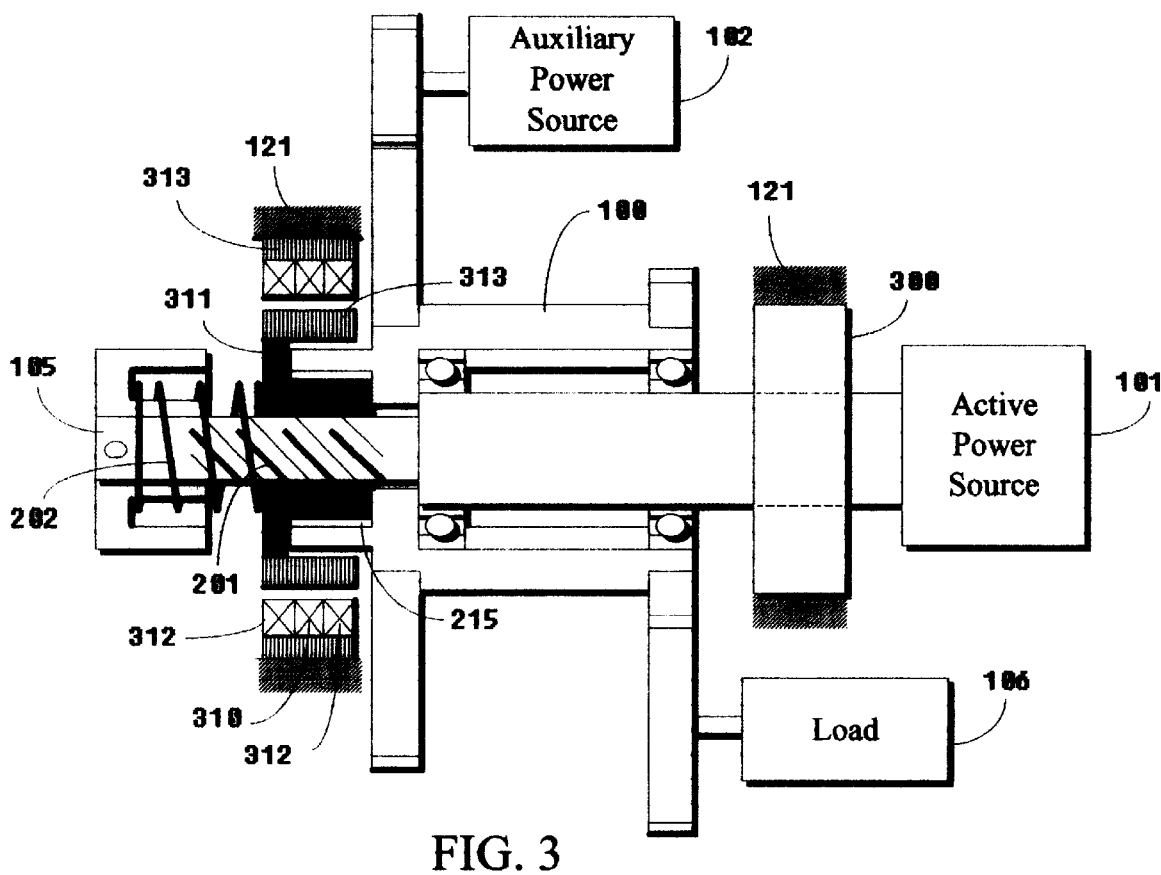
FIG. 3 is a schematic diagram of a rotation speed and rotation torque detector device according to a second preferred embodiment of the invention.

FIG. 3 illustrates a second embodiment of the co-generating type rotational speed and rotational torque detector device of the invention, including an axially translatable rotor 311 and a static structure for detecting the torque difference between the active power source rotation shaft 105 and the output shaft 100 and providing a relative power signal, as well as a driving rotation speed detector 300 installed between the active power source rotation shaft 105 and casing 121. The detector device of this embodiment is constructed as follows:

Active power source rotation shaft 105 is driven by the rotational kinetic energy of the active power source 101, and a screw structure 201 is provided between the active power source rotation shaft 105 and the shaft hole of an axially translatable rotor 311. The screw interactive structure 201 is comprised of a threaded or roller type screw arranged to be bi-directionally interactive, i.e. the active power source rotation shaft 105 can be rotated to cause the axially translatable rotor 311 to be translated axially, the axially translatable rotor 311 under pressure can conversely cause the active power source rotation shaft 105 to rotate, or the axially translatable rotor 211 can be rotated by itself. A lock key assembly or other mechanism 215 that permits axial sliding between the rotor 311 and shaft 100 while also enabling rotational transmission is provided between the axially translatable rotor 211 and the output shaft to allow relative axial translation during the rotational transmission between shafts 105 and 101 while maintaining the transmission status.

A pre-compressed spring 202 is installed between the active power source rotation shaft 105 and the active power source 101 to pre-compress or bias the translatable rotor 311 in order to cause relative axial translation of the rotor according to the direction and intensity of the transmission torque during the rotational power transmission between the active power source rotation shaft 105 and the axially translatable rotor 311, so that the axial translatable rotor 311 is correspondingly coupled with the static structure installed on the casing 121. The detector electric power signal is produced during the rotational interaction, with the intensity of the electric power detecting signal being determined by the relative axial coupling position between the axially translatable rotor 311 and the static structure, and the relative axial position being determined by the torque difference between the active power source 101 and the output shaft 100, the axial rotational translation produced by the axially translatable rotor 311 and the pre-compressed spring 202 further changing the axial coupling status between the axially translatable rotor 311 and the static structure. The driving speed detector device 300 is installed between the active power source 101 and the casing 121 for detecting the absolute rotation speed difference between the two.

The static structure can be comprised of a magnetically conductive iron core 313, with a first winding 310 as the input AC signal source, and a secondary winding 312 providing a translation detecting power signal. The axially translatable rotor 311 can be comprised of a structure having a magnetic conducting iron core 313 and a shaft hole structure for receiving the interactive screw.

Regardless of the relative position of the axially translatable rotor 311, when the rotation torque is zero, the output signal of the detector can be either zero, or can be set to be larger than or smaller than zero.

The output signal of the detector can be zero when the rotation speed of the driving speed detector device 300 is zero.

The torque difference signal and the absolute rotation speed signal can be either an analog or a digital signal. If the signal is an analog signal, it can be synthesized by the analog operational amplifier circuit and processed by the central controller 114 to further control the electrical machine driving device 115 to provide relative power driving for the auxiliary power source 102 and to provide an upper limit for its power output. In the case of a digital signal, the signal is processed by the central controller 114 to further control the electrical machine driving device 115 to provide relative power driving for the auxiliary power source 102 and to provide an upper limit for its power output.

The relative power signal may be linear or non-linear, and positively or inversely proportional to the relative rotational movement, the power signal ratio being changed due to the axially relative coupling position.

Output shaft 100 is driven by the rotational kinetic energy of the active power source 101 through the axially translatable rotor 311, and by the rotational kinetic energy of the auxiliary power source 102 via a direct coupling between the output shaft 100 and the rotor of the auxiliary power source 102. Methods of coupling with the load include direct coupling with the load, or through transmission devices such as a gear, chain wheel and/or linkages.

Figure 4:
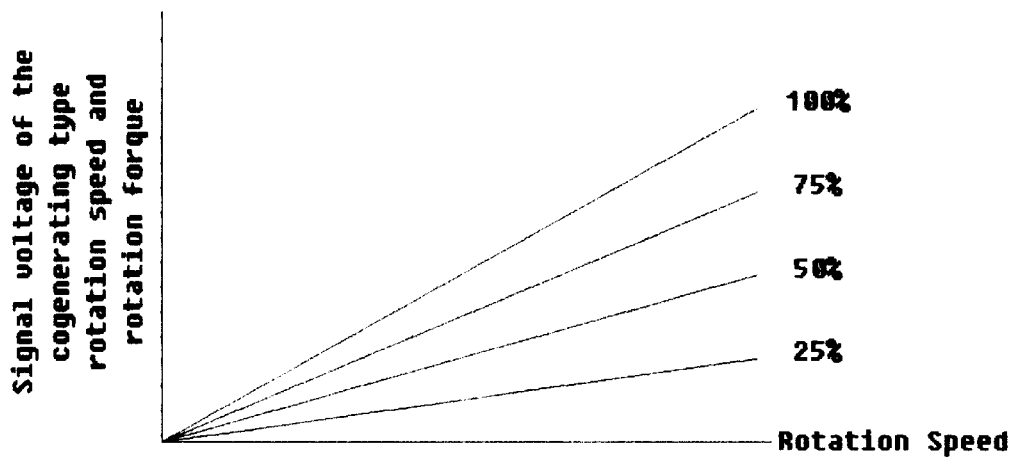
FIG. 4 is a graph showing operating characteristics of the embodiments of FIG. 2 and FIG. 3.

FIG. 4 shows the operating characteristics of the detectors of FIGS. 2 and 3, by illustrating the detected results of the rotation speed and rotation torque detector device 111 in terms of the interactive relationship between the synthesized voltage signal, rotation speed, and rotation torque.

Figure 5:
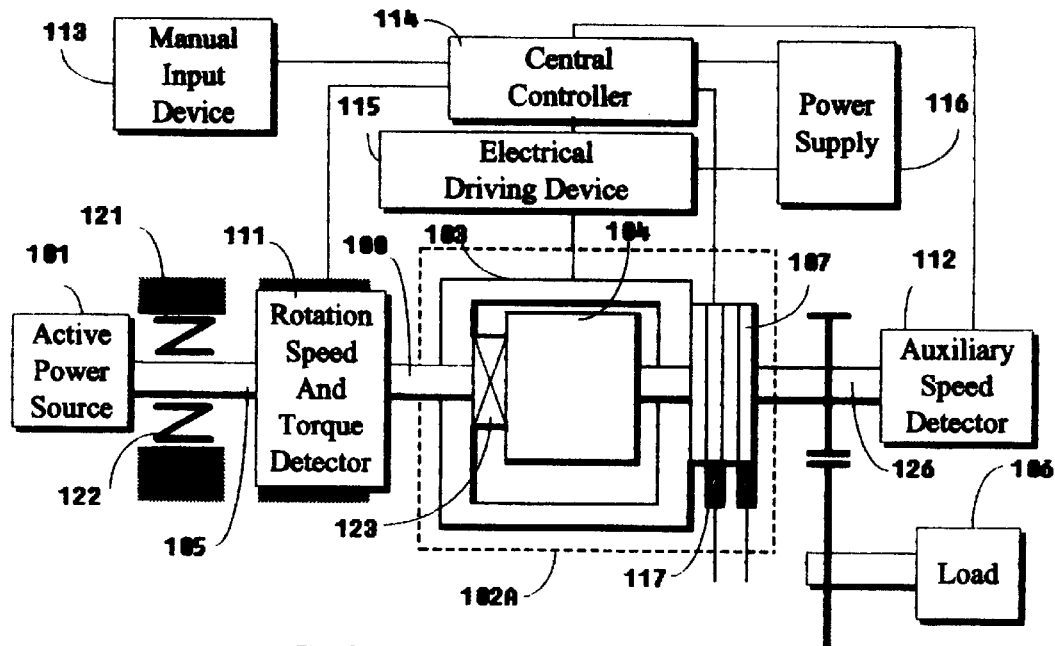
FIG. 5 is a functional block diagram of the invention illustrating a double-acting rotational electrical machine structure for proportional auxiliary speed driving.

FIGS. 5–8 illustrate examples of different auxiliary power sources utilizing detectors of the type illustrated in FIGS. 2 and 3, as follows:

(A) FIG. 5 is a block diagram of a combined power system using a co-generative type rotation speed and rotation torque detector device for proportional control, wherein the auxiliary power source is a double-acting rotational electrical machine 102A which is comprised of a first interactive rotor 103 and a second interactive rotor 104 that are mutually driven and that can be in the form of cylindrical, cup, disk or cone shapes. The electrical machine structure may include DC or AC, synchronous or asynchronous, brushed or brushless rotational electrical machine types constructed such that the first interactive rotor 103 is coupled with detector device 111 through the output shaft 100, and is further coupled with the active power source rotation shaft 105, while the second interactive rotor 104 drives, directly or through transmission components, the rotation output interface 126. A unidirectional clutch 122 can be installed between the active power source rotation shaft 105 and the casing 121 as required for selecting a direction to prevent reverse driving, or the unidirectional clutch can be omitted if this function is not desired. One of the first interactive rotor 103 and the second interactive rotor 104 may be an electrical machine field structure and the other may be an electrical machine rotor structure, and either or both of them can be further installed with an auxiliary conducting ring 107, conducting brush 117, and a brush seat to transmit power during double-acting driving. The arrangement of FIG. 5 provides one or several of the following functions at the same time:

1) A speed addition auxiliary driving function based on control of the speed ratio occurs when the first interactive rotor 103 is coupled through the output shaft 100 with the co-generating type rotation speed and rotation torque detector device 111 and is further coupled with the active power source 101, while the second interactive rotor 104 is connected to the rotation output interface 126.
2) A reverse damping function corresponding to the active power source occurs when the second interactive rotor 104 is at a standstill and the first interactive rotor 103 provides a reverse torque contrary to the operating direction of the active power source 101. The reverse torque can be smaller than the rotation torque of the active power source 101 and in a reverse direction from the active power source.
3) Kinetic energy recovery of the load 106 inertia or provision of a damping function to the back-transferred power of load 106 occurs when the first interactive rotor 103 is at a standstill, with the second interactive rotor 104 providing the regeneration function to further generate damping.

Figure 6:
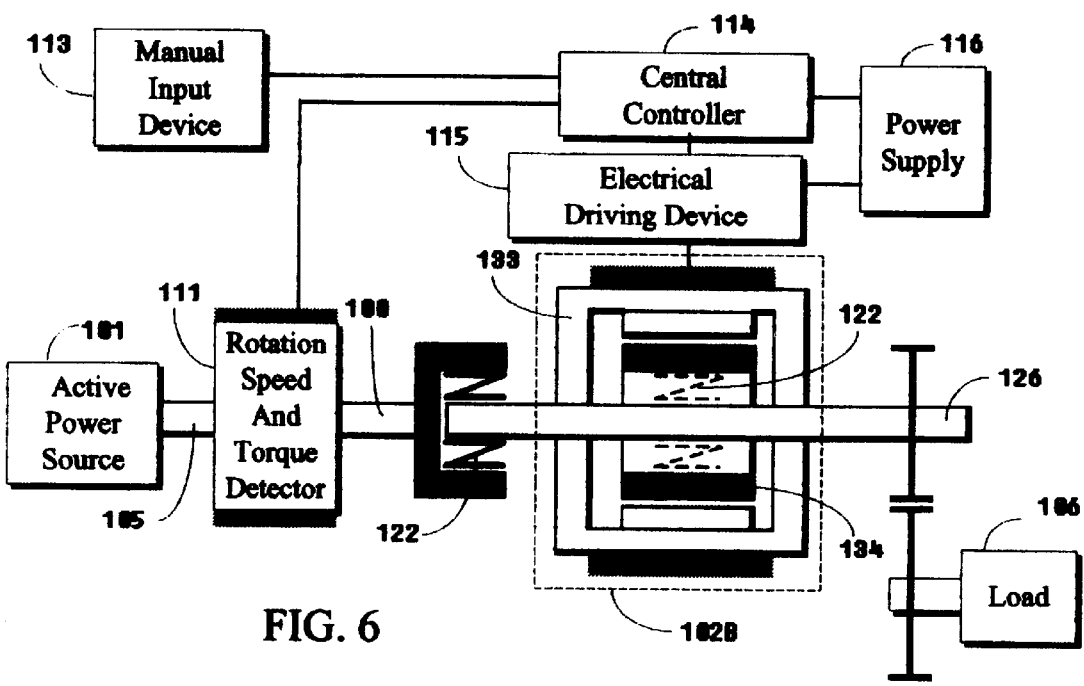
FIG. 6 is a functional diagram of the invention illustrating an electrical machine structure proportional auxiliary torque driving.

(B) FIG. 6 is a block diagram of a combined power system using a co-generative type rotation speed and rotation torque detector device for proportional control, in which the active power source and the auxiliary power source are on a common shaft. The static casing 133 of the auxiliary power source 102C is fixed, while the rotor 134 drives the load 106 using electrical machines of the above-described types to provide all or some of the following functions:

1) The active power source 105 drives the load 106 through the unidirectional clutch 122 and a coaxial rotational output interface shaft 126 of the electrical machine 102C. If the system is an open type system, then the unidirectional clutch 122 can be omitted.
2) The co-generating type rotation speed and rotation torque detector-device 111 is installed between the active power source rotation shaft 105 or its driven rotational structure and the static structure, and is employed to detect the rotation speed of the active power source 101 and its torque difference with the output shaft 100 to provide a system operational control reference.
3) The torque difference between the active power source and the output shaft 100 detected by the co-generating type rotation speed and rotation torque detector device is utilized to provide proportional auxiliary driving functions, in which case the active power source is rotated to drive the detector device 111, which supplies a corresponding signal to the central controller 114, and when the rotation speed signal reaches above a preset value, the auxiliary power source electrical machine 102C is driven by the electrical machine driving device 105 to generate an auxiliary driving torque in the same direction as the active power source rotation shaft, and the auxiliary driving torque is controlled according to the preset ratio of the central controller 114, or the auxiliary driving torque is determined by the manual operating device 113 to selectively control the electrical machine driving device 115 using the auxiliary power source electrical machine 102C.
4) The rotation speed of the auxiliary power source electrical machine 102C and the synthesized driving of the load 106 by the active power source 101 is always smaller than the rotation speed of the active power source 101.
5) A corresponding reverse damping function may be provided to limit the rotation speed of the active power source 101 by using the rotation speed of the active power source and the torque difference with the output shaft 100 detected by detector device 111 as the basis for controlling the auxiliary power source electrical machine 102C through the central controller 114 to generate the reverse damping. The control method is the same as the control method for auxiliary driving, except that the torque direction and the active power source 101 are contrary to each other, the reverse torque being generated according to the ratio set by the central controller 114 or by the manual operating device 113 through the electrical machine driving device 115 to control the auxiliary power source electrical machine 102C for adjusting the magnitude of the reverse torque.
6) When the auxiliary power source electrical machine 102C is driven by active power source 101, the maximum value of the controllable reverse torque damping of the auxiliary power source electrical machine 102C is always smaller than the driving torque supplied by the active power source 101 to the auxiliary power source electrical machine 102C, but when the system is selected for a reverse driving operation, the active power source 101 becomes the reverse driven load, so that the rotational torque of the auxiliary power source electrical machine 102C is always larger than or equal to the rotational torque of the active power source 101.
7) A kinetic energy recovery function is provided when the auxiliary power source electrical machine 102C is directly converted to perform generator functions and provide a power generation output for mechanical damping.

Figure 7:
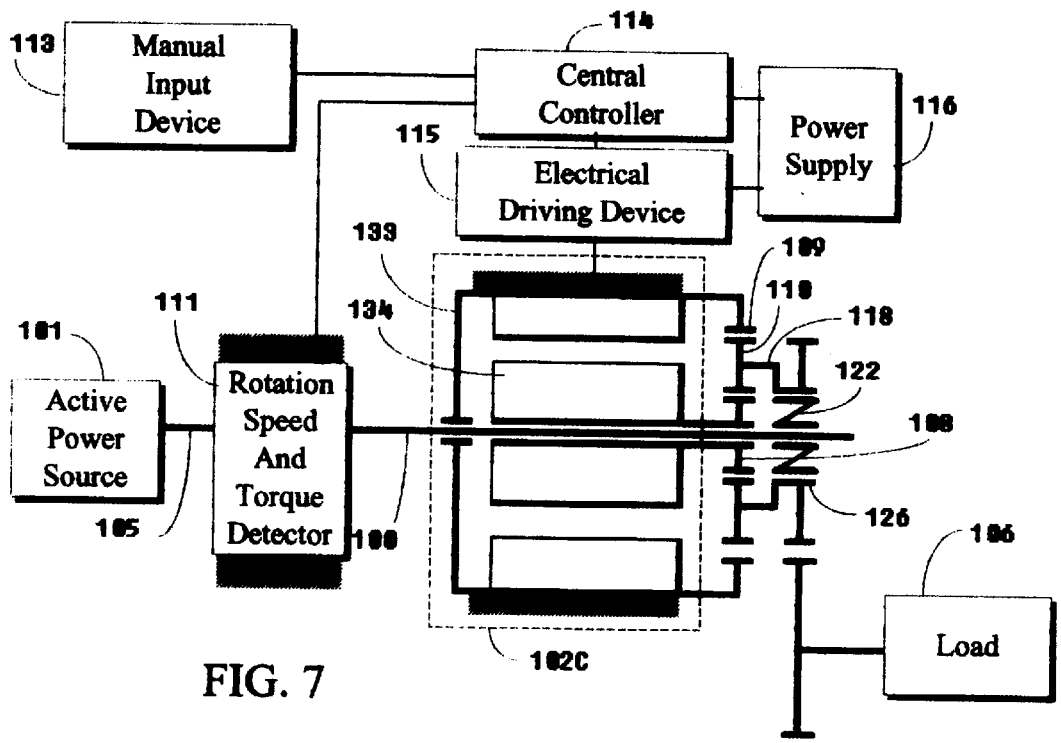
FIG. 7 is a schematic diagram illustrating a first preferred embodiment of an electrical machine and planetary (or differential) wheel system.

(C) FIG. 7 is a schematic diagram of a combined power system which uses the co-generative type rotation speed and rotation torque detector device for proportional control by means of an electrical machine and planetary (or differential) wheel system, and in which the auxiliary power source of the system is constituted by the electrical machine 102C, the electrical machine static casing 133 of which is fixed, while the load 106 is driven by the rotor 134. The electrical machine types may again include AC or DC, synchronous or asynchronous, brushed or brushless electrical machines arranged to provide one or several of the following structural or functional features at the same time:

1) The active power source rotation shaft 105 is coaxially installed in the electrical machine 102C, and couples through the unidirectional clutch 122 with an output swing arm 118 driven by the planetary wheel 110 to provide a connection to the rotation output interface 126. If the system is an open type system, then the unidirectional clutch 122 can be omitted.

2) The co-generating type rotation speed and rotation torque detector device 111 is installed between the active power rotation shaft 105 or its driven rotational structure and the static structure to detect the rotation speed of the active power source 101 and the torque difference with the output shaft 100 to provide a basis for system operational control.

3) To provide a proportional auxiliary driving function according to the rotation speed of the active power source, the detector device 111 is driven by the rotation of the active power source 101 to produce a corresponding signal and the signal is transmitted to the central controller 114. When the rotation signal reaches above a set value, the auxiliary power source electrical machine 102C is driven by the electrical machine driving device 115 along with the swing arm 118 via the planetary wheel 110 of the planetary wheel train, which is driven by the active power source rotation shaft through a unidirectional transmission device 122 to provide auxiliary driving torque in the same rotation direction, the auxiliary driving torque being controlled according to the ratio set by the central controller 114, or by the manual operating device 113 through the electrical machine driving device 115 to control the auxiliary power source electrical machine 102C and adjust the capacity of the auxiliary driving torque. If the system is an open type system, then the unidirectional clutch 122 can be omitted.

4) During auxiliary driving by the auxiliary power source 102C, the synthesized driving speed at which the load 106 is driven by the active power source 101 is always smaller than the driven rotation speed of the active power source 101.

5) A corresponding reverse damping function may be provided to limit the rotation speed of the active power source 101 by using the rotation speed of the active power source and the torque difference with the output shaft 100 detected by detector device 111 as the basis for controlling the auxiliary power source electrical machine 102C through the central controller 114 to generate the reverse damping. The control method is the same as the control method for auxiliary driving, except that the torque direction and the active power source 101 are contrary to each other, the reverse torque being generated according to the ratio set by the central controller 114 or by the manual operating device 113 through the electrical machine driving device 115 to control the magnitude of the reverse torque.

6) When the system is selected for reverse driven operation, the active power source 101 becomes a reverse driven load which is reverse driven by the auxiliary power source electrical machine 102C, and the rotation torque of the auxiliary power source 102C is always larger than or equal to the rotation torque of the active power source 101;

7) To provide a kinetic energy recovery function, auxiliary power source electrical machine 102B is caused to perform a generator function, thereby providing a power generation output for mechanical damping.

Figure 8:
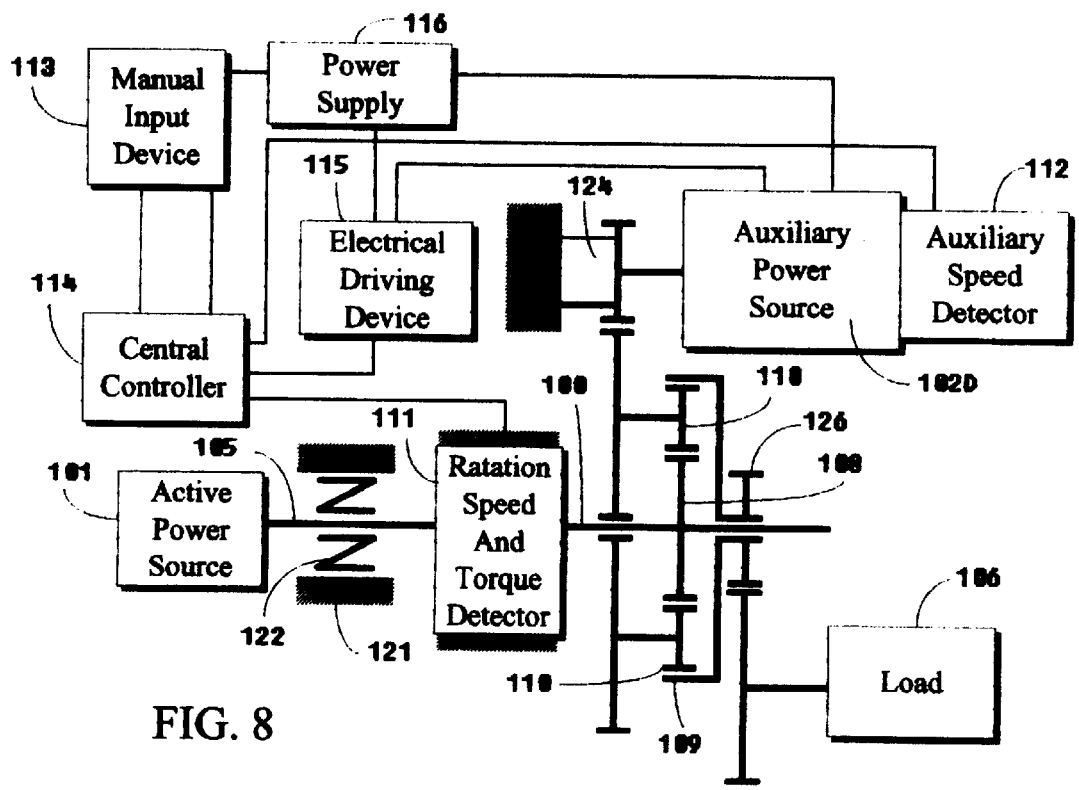
FIG. 8 is a schematic diagram of the invention illustrating the embodiment of an alternative electrical machine and the planetary (or differential) wheel system.

(D) FIG. 8 is a schematic diagram of a variation of the combined power system of FIG. 7 which also includes a planetary (or differential) wheel system, and in which the auxiliary power source is constituted by an electrical machine 102D coupled with the active power source through the planetary (or differential) wheel train. Again, electrical machine 102D may be an AC or DC, synchronous or asynchronous, brushed or brushless electrical machine, and the combined power system includes the following structural or functional features:

To provide a proportional auxiliary driving function, the active power source 101, auxiliary power source electrical machine 102D, and rotational output interface 126 are respectively coupled to a sun wheel 108, planetary wheel 1010, and the outer ring wheel 109 according to relative speed ratio and function requirements. The relationship between the active power source 101 and the auxiliary power source 102D is based on the rotation speed of the active power source detected by detector device 111, which is used to control the auxiliary power source and thereby achieve proportional auxiliary driving between the active and auxiliary power sources through the planetary (or differential) wheel train.

The above said combined power system uses a cogenerative type rotation speed and rotation torque detector device for proportional control, and can be further provided with the following peripheral operating devices to enlarge the application range:

A unidirectional clutch 122 can be series installed between the active power source 105 and the rotation output interface 126 for limiting the system to unidirectional rotation torque transmission. If the system is an open type system, then the unidirectional clutch 122 can be omitted.

Unidirectional clutch 122 can be further installed between the active power source rotation shaft 105 and the casing 121, so that the active power source is at a standstill while the auxiliary power source drives the load in a predetermined rotation direction. Again, if the system is an open type system, the unidirectional clutch 122 can be omitted;

A controllable clutch 123, which can be operated manually, or controlled by mechanical, hydraulic, or electromagnetic power, may be further installed between the active power source 105 and the casing 121 to replace the unidirectional clutch 122. When the clutch is released, auxiliary speed or torque addition driving is performed between the active power source and the auxiliary power source according to a corresponding ratio, or a reverse torque damping function is provided by the auxiliary power source to the active power source. When the clutch is closed, the active power source is locked, while the load 106 is positively or reversibly driven by the auxiliary power source, or the kinetic energy of the inertia of the load 106 is recovered for power regeneration. If the system is of open type, unidirectional clutch 122 or controllable clutch 123 can both be omitted, or just the controllable clutch can be omitted.

When the auxiliary power source is a double-acting rotational electrical machine 102A, the controllable clutch 123, which can be operated manually, or controlled by mechanical, hydraulic, or electromagnetic power, can be installed in such a manner that when the controllable clutch 123 is closed, the double-acting structure is inter-locked to allow the active power source to drive the load 106 directly, and if the system is of open type, the controllable clutch 123 can be omitted.

When the auxiliary power source is electrical machine 102B or 102C, the electrical machine rotor 134 is directly coupled with the active power source 101 and directly connected with the output shaft of the rotational output interface 126, or indirectly coupled through transmission components, and a unidirectional clutch 122 can be further installed to enable interaction between motor 134, power source 101, and interface 126. Possible locations for installing the unidirectional clutch 122 and its kinetic energy transmission directivity include: (i) if the active power source is connected to rotational output interface 126 directly or through the transmission components, then the unidirectional clutch 122 is installed between the electrical machine rotor 134 of the auxiliary power source and any rotational component between the above said active power source and the rotational output interface 126, the rotation direction permitted by the unidirectional clutch 122 being selected according to system requirements; (ii) if the auxiliary power source electrical machine rotor 134 is directly, or through the transmission components, connected to the rotational output interface 126, then the unidirectional clutch 122 can be installed between the active power source 101 and any rotation component between the above said auxiliary power source 102B or 102C and the rotational output interface 126, the rotation direction of the unidirectional clutch 122 being selected according to system requirements; and (iii) if the system is of open type, then the unidirectional clutch 122 can be omitted.

When the auxiliary power source electrical machine 102D is coupled with the active power source through the planetary (or differential) wheel train, then a brake 124 can be further installed on the rotation shaft of the auxiliary power source electrical machine 102D, thereby preventing rotation of the auxiliary power source and its transmission components while allowing the active power source electrical machine 102D to be reverse driven by the inertia of load 106 in order to provide power regeneration and produce braking damping. If the system is of open type, then the brake 124 can be omitted.

In practical applications, the clutches and the control systems for the above applications can be selected to include part or all of the following functions:

By referring to the rotation speed of the active power source and the torque difference between the active power source and 100, the auxiliary power source can be controlled for auxiliary driving.

By referring to the rotation speed of the active power source and the torque difference between the active power source and 100, the auxiliary power source can be operated to apply a reverse torque relative to the active power source and provide damping. The auxiliary power source can also be independently controlled for positive or reverse directional driving, or power regeneration or kinetic energy recover.

In summary, the combined power system of the invention uses a co-generative type rotation speed and torque detector device for linear or non-linear proportional control of an auxiliary power source based on the rotation speed of the active power source and the torque difference between the active source and an output shaft, or to provide damping of the active power source through the reverse torque generated by the auxiliary power source. The combined power system of the invention is widely applicable to auxiliary driving of control mechanisms, electricity assisted carriers, controllable damping devices, etc.

I claim:

1. A combined power system, comprising:
   an active power source arranged to supply power to a load;
   an auxiliary power source;
   a transmission including means for transmitting power from said active power source and said auxiliary power source to said load;
   a rotational speed and torque detector including means for detecting (i) a rotational speed of a power input from the active power source to the transmission, and (ii) a torque difference between a rotational torque of said power input and a rotational torque of an output of said transmission to said load; and
   a controller including means for controlling said auxiliary power source in response to detection by said detector of said rotational speed and said torque difference.

2. A combined power system as claimed in claim 1, wherein said means for controlling said auxiliary power source in response to detection of said rotational speed and said torque difference includes means for proportionally controlling a speed of said auxiliary power source based on the detected rotational speed and torque difference.

3. A combined power system as claimed in claim 2, wherein said auxiliary power source is proportionally controlled according to a pre-set ratio.

4. A combined power system as claimed in claim 2, wherein said auxiliary power source is proportionally controlled according to a ratio selected by a manual operating device.

5. A combined power system as claimed in claim 1, wherein said means for controlling said auxiliary power source in response to detection of said rotational speed and said torque difference includes means for proportionally controlling a torque of said auxiliary power source based on the detected rotational speed and torque difference.

6. A combined power system as claimed in claim 5, wherein said auxiliary power source is proportionally controlled according to a pre-set ratio.

7. A combined power system as claimed in claim 5, wherein said auxiliary power source is proportionally controlled according to a ratio selected by a manual operating device.

8. A combined power system as claimed in claim 1, wherein said means for controlling said auxiliary power source in response to detection of said rotational speed and said torque difference includes means for causing said auxiliary power source to provide a power regeneration effect and limit the power transmitted to said load.

9. A combined power system as claimed in claim 8, wherein said power limit is preset.

10. A combined power system as claimed in claim 8, wherein said power limit is set by a manual operating device.

11. A combined power system as claimed in claim 1, further comprising an auxiliary power source speed detector that provides feedback to said control circuit to assist in controlling said auxiliary power source based on the detected speed and torque difference.

12. A combined power system as claimed in claim 1, wherein said transmission comprises a rotor arranged to rotate around an axis and to translate in a direction parallel to said axis in response to said torque difference, said rotor being caused to rotate at a same speed as an output shaft of said active power device by a key lock mechanism arranged to limit relative rotation between said output shaft and said rotor while permitting axial translation, and wherein said detector is arranged to detect a rotational speed and axial position of said rotor.

13. A combined power system as claimed in claim 12, wherein said rotor is mounted on a screw structure whose angle is determined by the torque difference, the rotor being compressed against the screw structure by a compression spring so that said angle of said screw structure determines an axial position of said rotor.

14. A combined power system as claimed in claim 12, wherein said rotor includes a magnet and said detector includes a winding positioned on a stationary casing in which said rotor is situated, and wherein the signal generated by said winding results from the combined effects of the rotational speed of said rotor and the axial position of said rotor.

15. A combined power system as claimed in claim 12, wherein said rotor includes a magnetically conductive core and said detector includes a first winding connected to an AC signal source and a second winding arranged to detect an effect of said core on a magnetic field generated by said first winding, and wherein the signal generated by said second winding results from the combined effects of the rotational speed of said rotor and the axial position of said rotor.

16. A combined power system as claimed in claim 1, wherein the auxiliary power source comprises a first interactive rotor and a second interactive rotor, and wherein the first rotor is coupled to an output shaft of said active power source and said second rotor is coupled to said load.

17. A combined power system as claimed in claim 1, wherein the auxiliary power source includes a stator and a single rotor having a shaft coaxially connected between a shaft of the active power source and the load.

18. A combined power system as claimed in claim 1, wherein the auxiliary power source is an electrical machine having a rotor whose shaft is coaxially installed with a shaft of the active power source and is connected to a planetary wheel arranged to drive a swing arm connected to a rotational output interface which provides said output to said load.

19. A combined power system as claimed in claim 1, wherein the auxiliary power source is an electrical machine coupled with the active power source through a differential wheel train.

20. A combined power system as claimed in claim 19, further comprising a brake installed on a rotational shaft of the auxiliary power source to lock up the auxiliary power source while allowing the active power source to directly drive the output of the transmission to the load, or to lock up the active power source while allowing the auxiliary power source to be reverse driven by the inertia of the load and thereby provide power regeneration.

* * * * *